US006701012B1

(12) United States Patent
Matthews

(10) Patent No.: US 6,701,012 B1
(45) Date of Patent: Mar. 2, 2004

(54) OUT-OF-LAYER PIXEL GENERATION FOR A DECOMPOSED-IMAGE LAYER

(75) Inventor: Kristine E. Matthews, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 793 days.

(21) Appl. No.: 09/624,428

(22) Filed: Jul. 24, 2000

(51) Int. Cl.$^7$ ................................................. G06K 9/34
(52) U.S. Cl. ....................... 382/173; 382/228; 382/176; 358/464
(58) Field of Search ................................. 382/173, 176, 382/137, 112, 177, 179, 171, 165, 239–240, 167, 232–233, 254, 266, 275, 224–228; 358/1.9, 1.15, 462, 464, 406, 2.1, 426.15–426.16, 426.01

(56) References Cited

U.S. PATENT DOCUMENTS

| 4,590,606 | A |   | 5/1986  | Rohrer ........................ 382/137 |
| 5,392,362 | A |   | 2/1995  | Kimura et al. .............. 382/176 |
| 5,748,780 | A |   | 5/1998  | Stolfo ........................ 382/232 |
| 5,778,092 | A |   | 7/1998  | MacLeod et al. ........... 382/176 |
| 5,956,468 | A | * | 9/1999  | Ancin ........................ 358/1.9 |
| 5,999,710 | A |   | 12/1999 | Smith et al. ................ 358/1.15 |
| 6,078,697 | A | * | 6/2000  | Ng ............................. 382/275 |
| 6,373,981 | B1 | * | 4/2002 | de Queiroz et al. ........ 382/176 |
| 6,633,670 | B1 | * | 10/2003 | Matthews .................... 382/176 |

OTHER PUBLICATIONS

Leung et al., An iterative image segmentation algrorithm utilizing spatial information , IEEE 0–7803–3679, 141–146.*

Lossy Compression of Partially Masked Still Images.
Draft ITU–T Recommendation T.44 "Mixed Raster Content (MCR)".
High Quality Document Image Compression with DjVu.
Color Documents on the Web with DjVu.
Digipaper: A Versatile Color Document Image Representation.
Compression of Compound Documents.

* cited by examiner

Primary Examiner—Leo Boudreau
Assistant Examiner—Ishrat Sherali
(74) Attorney, Agent, or Firm—Chernoff, Vilhauer, McClung & Stenzel, LLP

(57) ABSTRACT

Images may be decomposed into separate layers each containing a limited number of types of image element (text, line art, or photographic). Each layer can then be compressed separately with a process that is optimal for the type of image element included in the layer. Images are decomposed into foreground, background, and mask layers. A method is provided for generating the out-of-layer pixels and, as a result, generating a layer having a limited color palette that is to be compressed with a palette based lossless compression method. A plurality of neighboring pixels is identified for each pixel selected from the image. If the neighboring pixels are out-of-layer pixels, the spatially corresponding pixel in the decomposition layer is assigned a default value. If the neighboring pixels include in-layer pixels, the pixel of the decomposition layer spatially corresponding to the selected pixel is assigned the predominant color of the in-layer neighbors. If equal numbers of the neighboring pixels have the same colors then the selected pixel is assigned the value of a predetermined neighbor. If no two neighboring pixels have the same color then the spatially corresponding pixel is assigned the color that is most likely to occur in conjunction with pixels having the colors of the neighboring pixels.

12 Claims, 5 Drawing Sheets

OUT-OF-LAYER PIXEL GENERATION FOR A DECOMPOSED-IMAGE LAYER

BACKGROUND OF THE INVENTION

The present invention relates to layered decomposition of images and, more particularly, to a method of generating out-of-layer pixels for a layer of a decomposed image.

The large size of digital data files required to represent images makes data compression an imperative when storing or transmitting images. On the other hand, compression can be problematic because many images comprise a combination of text, line-art graphics elements, and photographic or natural image elements and compression processes are commonly designed to be more effective with one type of image element than another. For example, JPEG (Joint Photographic Experts Group) (ISO 10918) encoders are designed to most effectively compress the complex multicolor matrix of photographic image elements. Annoying artifacts can appear in decompressed images, especially in the vicinity of sharp color transitions which are common characteristics of graphical and textual elements. On the other hand, the compression process of the JBIG (Joint Bilevel Image Group) standard (ISO/IEC 11544:1993) utilizes arithmetic encoding and is particularly effective in compressing text and graphics but less effective in compressing photographs of natural elements.

One method for improving the efficiency and results of image compression decomposes compound images into layers containing a type or limited number of types of elements that are effectively compressed using a single process. The data of each layer is then compressed with a process that is particularly effective with the type of data contained in the layer. The DRAFT ITU-T RECOMMENDATION T.44 "MIXED RASTER CONTENT (MRC)," International Telecommunication Union (ITU), Telecommunication Standardization Sector, October 1997, incorporated herein by reference, specifies the technical features of an imaging format based on segmentation or decomposition of images or pages into multiple layers (planes) according to the type of image element and the application of encoding, spatial resolution, and color resolution processing specific to the types of image elements comprising the layer. Referring to FIG. 1, the ITU recommendation models a page or image 10 as three layers: a background layer 12 containing contone color (continuous tone and palettized color) elements; a foreground layer 14 containing text and line-art graphics, and a bi-level mask layer 16 interposed between the background 12 and foreground 14 layers. The decomposition of an image requires generation of the three layers. The mask is used to select the layer (background or foreground) from which a pixel will be rendered when the image is recomposed. The mask layer is generated by a process that decides whether a pixel of the image 10 belongs in the foreground 14 or the background 12 layer. In the exemplary mask layer 16 a white pixel 18 indicates that the spatially corresponding pixel in the recomposed image is to be obtained from the foreground layer 14. A black pixel 20 in the mask indicates that the spatially corresponding pixel of the recomposed image is to be obtained from the background layer 12.

A second step in the decomposition process is the generation of the foreground 14 and background 12 layers. The first step is analogous to pouring the image 10 through a mask layer 16 comprising a screen with certain pores plugged. When the image 10 is "poured" through the mask 16 the pixels of the background 12 are stopped by the plugged, black pores 20 while the pixels of the foreground layer 14 flow through the open, white pores 18 of the mask. The result of the separation process is a background layer 12 and a foreground layer 14 each comprising "in-layer" pixels 22 or pixels that properly belong in the layer and transparent "out-of-layer" pixels 24. Out-of-layer pixels 24 are pixels of a layer that spatially correspond to a pixel that is assigned to the other layer by the mask. The "out of layer" pixels may be considered to be transparent pixels or "holes" in the layer resulting from the layer separation process.

While the out-of-layer pixels are not used and their color values are unimportant for the image recomposition process, the colors of these pixels are important to the efficient compression of the layer and the reduction of artifacts in the recomposed image. If the values chosen for the out-of-layer pixels are inappropriate, the efficiency of the compression process applied to the layer will suffer or the recomposed image may contain artifacts. As an extreme example, if an out-of-layer pixel was assigned its color in the original image in the foreground and background layers, two images identical to the original would be generated by the layer separation process and there would be no value in decomposing the image into layers. For effective compression and reduction of artifacts in the recomposed image, it is desirable to further process the separation layers 12 and 14 to construct a final image decomposition layer by assigning color values to out-of-layer pixels 24 that are consistent with the in-layer pixels and the compression algorithm to be applied to the layer.

R. L. de Querioz described a layered image decomposition in the paper COMPRESSION OF COMPOUND DOCUMENTS, Proceedings 1999 IEEE International Conference on Image Processing, October 1999. The image is decomposed into two layers both of which are to be compressed using a JPEG encoder. The JPEG encoder performs discrete cosine transform (DCT) encoding on 8×8 blocks of pixels and is particularly suited to compressing continuous tone images of natural elements. In this process, if the entire block of pixels comprises out-of-layer pixels, the pixels are assigned a color equivalent to the average color value of the pixels in the previous block. If the pixels of the block are a mixture of in-layer and out-of-layer pixels, a multi-pass algorithm is used to select a value for the out-of-layer pixels. With each pass, the pixels immediately adjacent to any out-of-layer pixel are checked. If any pixels neighboring the out-of-layer pixel are in-layer pixels, the out-of-layer pixel is replaced with the average value of those in-layer pixels and the out-of-layer pixel is designated to be an in-layer pixel. The procedure is repeated until all out-of-layer pixels have been designated as in-layer pixels. Since the JPEG encoder differentially encodes the DC component of the transformed block, it is particularly suited to encoding a layer or image where colors smoothly transition. However, the JPEG encoder is not well suited to image elements having hard edges (typical of text and line art). Palette-based lossless compression is simple and effective for compressing images or layers comprising a limited palette. Averaging the colors of neighboring pixels produces additional colors unduly complicating the palette and reducing the efficiency of the palette-based lossless compression processes.

MacLeod et al., U.S. Pat. No. 5,778,092 disclose a method for plugging holes or generating out-of-layer pixels in a foreground layer for a decomposed image. The method utilizes a sequential two pass examination of the pixels neighboring an out-of-layer pixel. The first pass is a downward examination of neighbors above and left of the out-of-layer pixel or hole. The second examination is an upward pass during which neighbors below and to the right of the out-of-layer pixel are examined. The color assigned to the out-of-layer pixel is the color of the nearest in-layer pixel where nearness is in terms of a four-connected grid. While the method does not create additional colors for pixels, the image must be scanned twice and the results of the scans stored before out-of-layer pixels are generated.

What is desired, therefore, is an efficient method of generating out-of-layer pixels for an image decomposition layer that is described by a limited color palette and which is to be compressed using a palette-based lossless compression method.

SUMMARY OF THE INVENTION

The present invention overcomes the aforementioned drawbacks of the prior art by providing a method of generating an out-of-layer pixel of a layer of a decomposed image comprising the steps of identifying a plurality of pixels neighboring the out-of-layer pixel; assigning a default color to the out-of-layer pixel if the pixels of the neighboring plurality are out-of-layer pixels for which no color is assigned; assigning a color predominating for in-layer pixels of the plurality of neighbors to the out-of-layer pixel; assigning a color of a predetermined neighboring pixel to the out-of-layer pixel if equal numbers of the in-layer neighboring pixels are of a plurality of colors; and if no two in-layer neighboring pixels are of the same color, assigning to the out-of-layer pixel a color of a neighboring pixel that is most likely to occur in conjunction with pixels of the colors of the in-layer neighboring pixels. If no two in-layer, neighboring pixels are of the same color, the out-of-layer pixel is assumed, successively, to be of the same color as each of the neighboring pixels. The pixel color combination occurring more often or the sum of the pixel color combinations occurring most often in the layer is used to select the color of the out-of-layer pixel.

A method of generating a layer of a decomposed image is also provided comprising the steps of selecting a pixel of the image; determining if the selected pixel is an in-layer pixel to a layer of the decomposed image; if the selected pixel is an out-of-layer pixel, identifying a plurality of pixels of the decomposition layer neighboring the selected pixel; assigning a default color to a pixel of the decomposition layer spatially corresponding to the selected pixel if all the pixels of the neighboring plurality are out-of-layer pixels; assigning a color predominating for in-layer, neighboring pixels to the spatially corresponding pixel; assigning to the spatially corresponding pixel a color of a predetermined neighboring pixel if equal numbers of the in-layer neighboring pixels are of the same plurality of colors; if no two in-layer neighboring pixels are of the same color, assigning to the spatially corresponding pixel a color of a neighboring pixel that is most likely to occur in conjunction with pixels of the colors of the in-layer neighboring pixels; if the selected pixel is an in-layer pixel, assigning a color of the selected pixel to the spatially corresponding pixel; and storing the color assigned to the spatially corresponding pixel in data of the decomposition layer.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
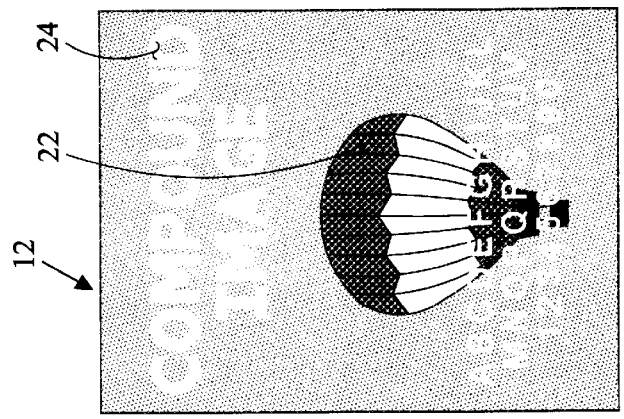
FIG. 1 illustrates an exemplary compound image including image elements of differing types and layered decomposition of the image into a mask layer and foreground and background separation layers.
Figure 1:
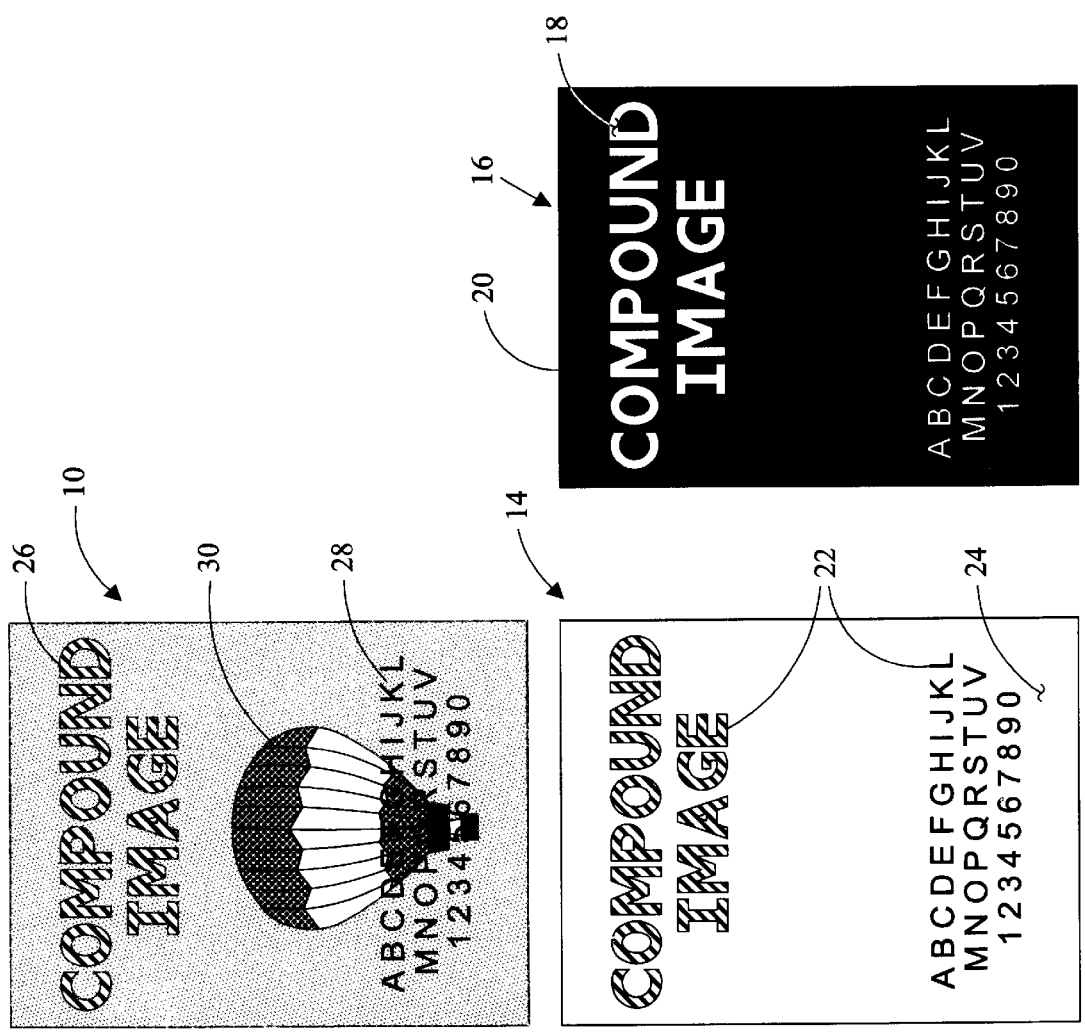

A compound page or image 10 comprising textual elements of a first color 26 and a second color 28 and a photographic or continuous tone element 30 is illustrated in FIG. 1. An image may also contain graphic or line art elements which are not illustrated in FIG. 1. For purposes of data storage or transmission, it is desired to decompose the image 10 into layers, each layer containing one or more specific types of image element. For example, the text elements 26 and 28 might be included in a foreground layer 14 while the photographic element 30 is included in a background layer 12. When the image 10 is recomposed and rendered, each pixel of the recomposed image will be selected from one of the spatially corresponding pixels of either the foreground 14 or background 12 layers as determined by a bi-level switch in the form of the value taken by a spatially corresponding pixel of a mask layer 16 graphically interposed between the foreground 14 and background 12 layers. For example, if a pixel at a particular spatial location in the mask 16 is represented as a digital "1" (white) 18, the color of the spatially corresponding pixel in the final image would correspond to the color of the spatially corresponding pixel in the foreground layer 14. On the other hand, if the mask pixel is a "0" (black) 20, the color of the spatially corresponding pixel for the final image would be selected from the other layer, the background 12. The mask layer is generated by a process that determines the layer to which a pixel belongs. Such processes are known and beyond the scope of this disclosure. Layered decomposition comprises the steps of generating a mask assigning each pixel of an image to one of the foreground or background layers and generating the foreground and background layers.

The initial step in generating the foreground 14 and background 12 layers comprises separating the pixels of the original image 10 into the correct layers. This step is analogous to pouring the image 10 through a mask layer 16 comprising a screen with certain plugged pores. When the image 10 is "poured" through the mask 16 the pixels of the background 12 are stopped by the plugged, black pores 20 while the pixels of the foreground layer 14 flow through the open, white pores 18 of the mask. The result of the separation process is a separation background layer 12 and a separation foreground layer 14 each comprising "in-layer" pixels 22 or pixels from image elements of the type belonging in the layer and transparent "out-of-layer" pixels 24. The out-of-layer pixels 24 are pixels of a layer that spatially correspond to a pixel of the image that is assigned to the other layer by the mask. The "out of layer" pixels may be considered to be transparent pixels or "holes" in the layer resulting from the layer separation process.

While the out-of-layer pixels are not used in the recomposition of the image, the color values of these pixels are important to the efficient compression of the layer and the reduction of artifacts in the recomposed image. If the values chosen for the out-of-layer pixels are inappropriate, the efficiency of the compression process applied to the layer will suffer or the recomposed image may contain artifacts. For effective compression and reduction of artifacts in the recomposed image, it is desired to assign values to out-of-layer pixels 24 that are consistent with the in-layer pixels and the compression algorithm to be applied to the layer.

Figure 2:
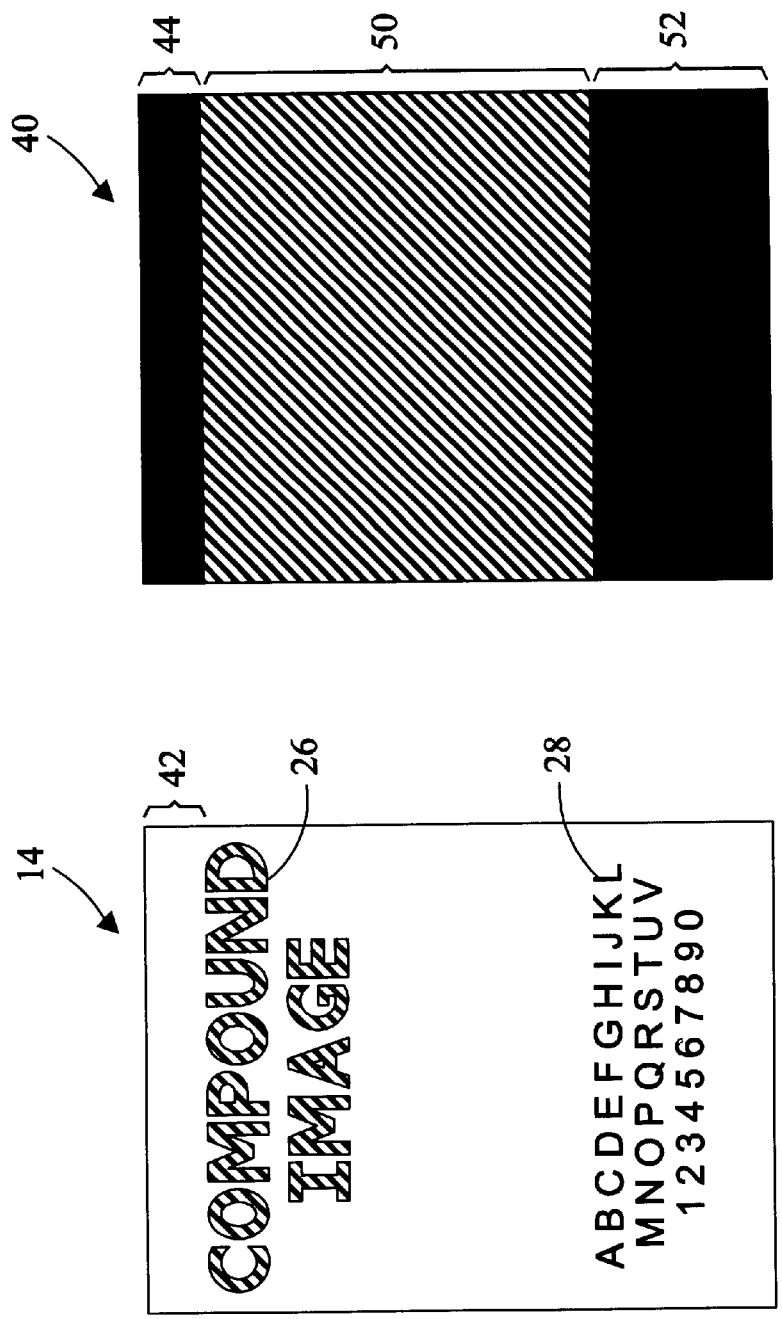
FIG. 2 illustrates an exemplary final foreground layer generated from the exemplary separation foreground layer of FIG. 1.

A typical foreground layer may include text and line art graphics elements. As a result, the number of colors of the palette required to describe the in-layer pixels is relatively limited. For example following separation of the pixels of the image 10, the exemplary separation foreground layer 14 includes the text element 26 of a first color, the text element 28 of a second color (black) and the out-of-layer pixels 24. The pixels of the transparent area surrounding the text elements 24 and 26 are out-of-layer because the spatially corresponding pixels of the image 10 have been assigned to the background layer 12 by the mask layer 16. While the colors of the out-of-layer pixels are unimportant for the purpose of recomposing the image 10, their colors are significant in maximizing the performance of the compression algorithm that will be applied to the foreground layer. A palette-based compression method is useful for compressing the data related to an image having a limited number of colors. In a palette-based compression algorithm, each pixel color is mapped to an index value and the index is used to describe the colors. Since the index space is usually less than the color data space, the data describing the image is compressed. Referring to FIG. 2, the method of the present invention can be used to generate out-of-layer pixels for a final foreground layer 40 to be produced from the separation foreground layer 14.

Figure 3A:
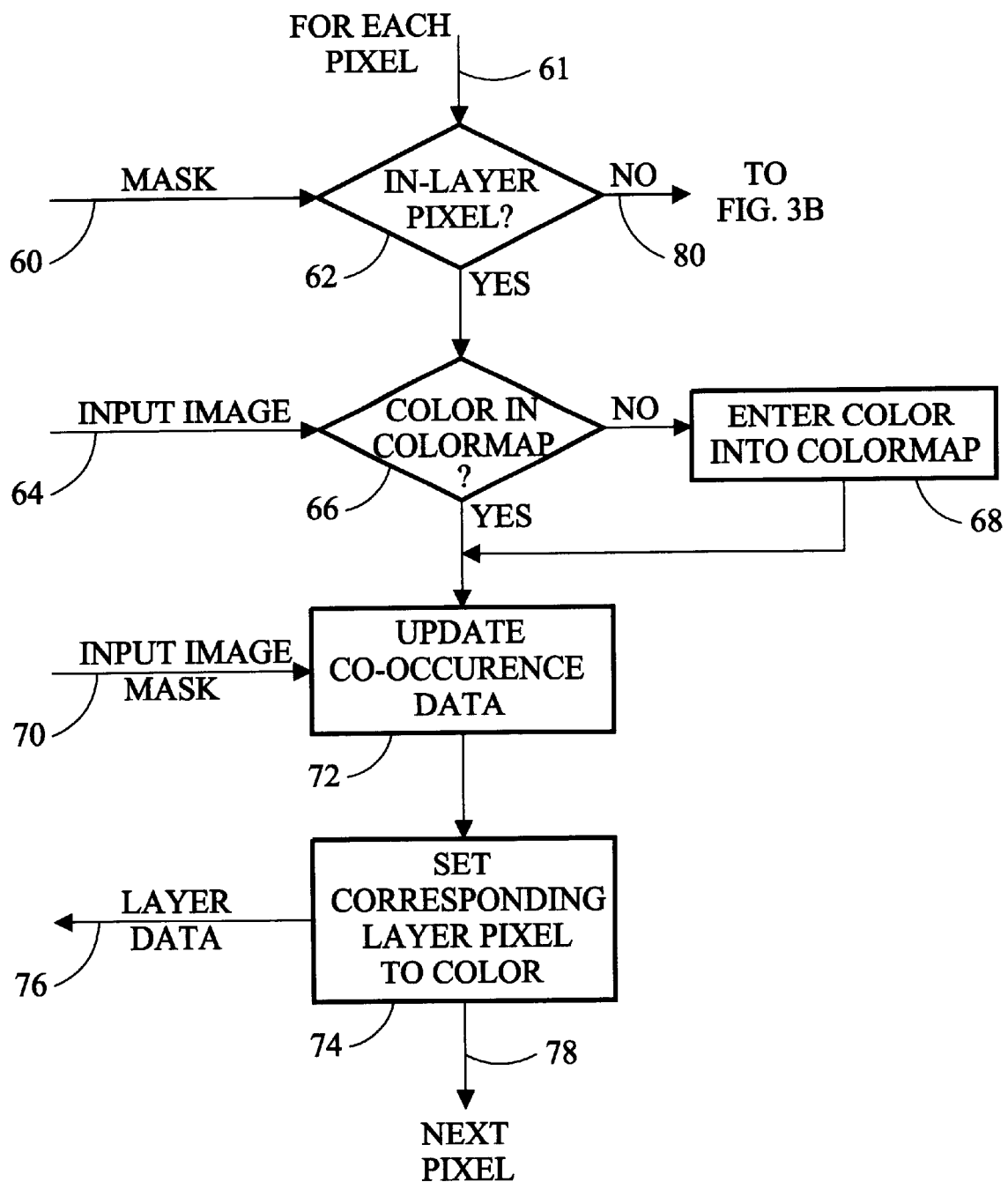
FIG. 3A is a block diagram illustrating the steps of a portion of the pixel generation method.
Figure 3B:
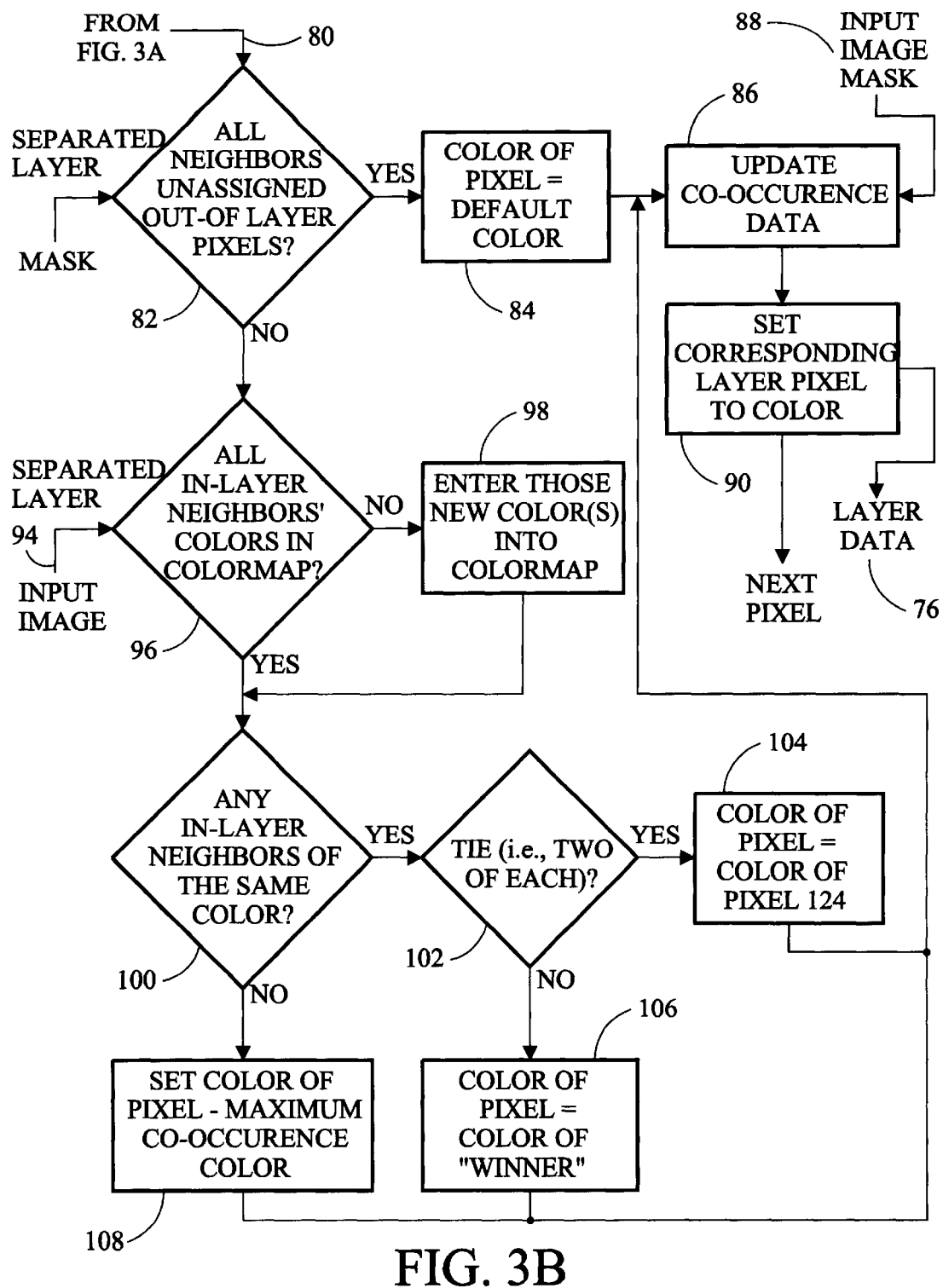
FIG. 3B is a block diagram illustrating, in conjunction with FIG. 3A, the steps of the pixel generation method.

Referring to FIG. 3A, each pixel of the image is selected and input 61 to the pixel generation method. The value of the spatially corresponding pixel in the mask layer 60 is examined to determine whether the selected pixel is an in-layer pixel 62. If the selected pixel is an in-layer pixel, the color value of the pixel obtained from the image 64 is compared to the colors in a color map to determine if the pixel's color is included 66. The color map is a palette of indexed colors of the layer. The color map can be indexed in an order reflecting the co-occurrence of palette colors or the relative numbers of occurrences of particular colors in adjacent pixels. For example, if a foreground layer includes colors red, black, blue, and orange, and if orange pixels are found adjacent to black pixels more often than are red or blue pixels, then the index values for the colors black and orange would be adjacent to each other in the color map. While a method of generating an indexed color map is beyond the scope of this disclosure, indexing the colors of the color map in order of likely co-occurrence of palette colors increases the efficiency of the compression process by reducing the magnitude of the index differences that must be coded. If the color of the in-layer pixel is not already included in the color map, the color is added 68. With the color of the selected pixel included in the color map, the color of the spatially adjacent pixel is determined from the image and mask layer and the co-occurrence data for the color map is updated 72 and stored in an accumulator. The spatially corresponding pixel of the final layer 40 is then assigned the color of the selected input pixel 74 and stored with the layer data 76. The next pixel is then selected from the image for processing 78.

Figure 4:
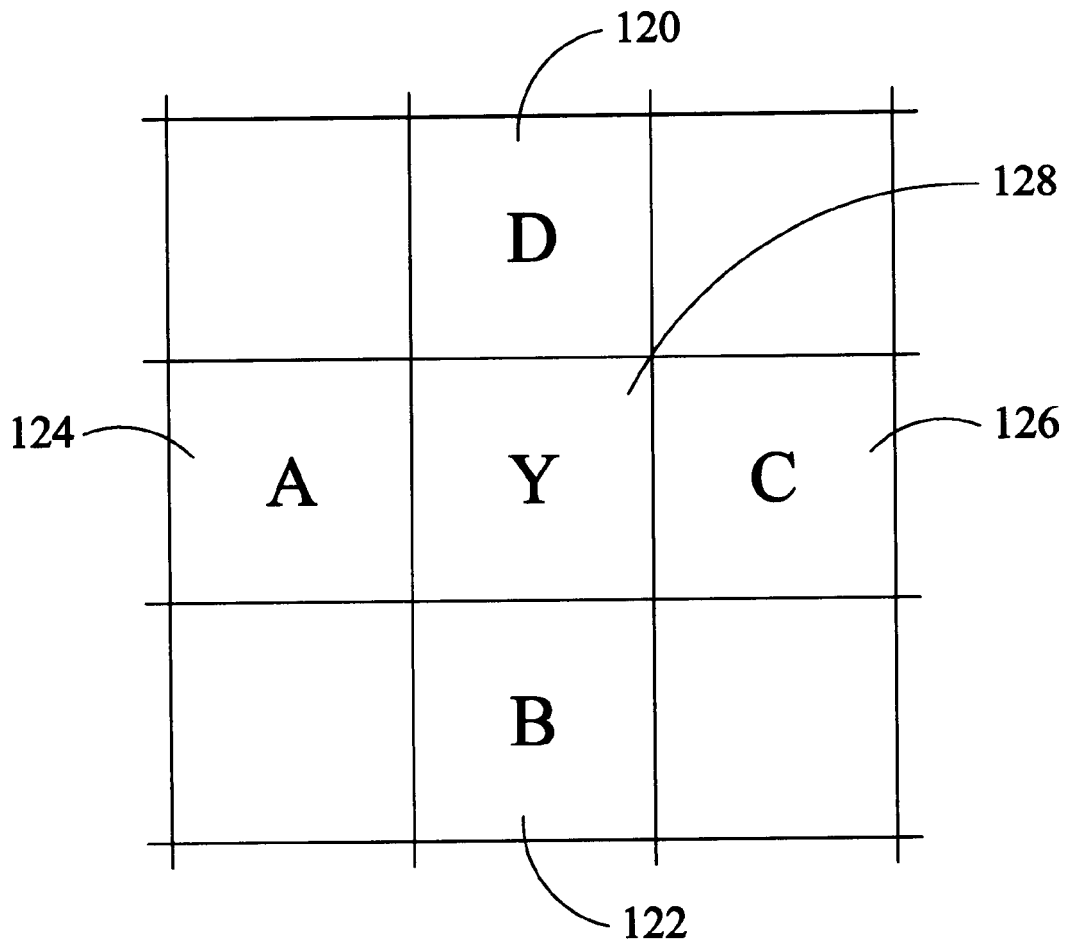
FIG. 4 illustrates a plurality of pixels neighboring an out-lo-layer pixel to be generated.

Referring to FIG. 3A, if the selected pixel 61 is an out-of-layer pixel 80, the method examines a plurality of neighboring pixels to determine an appropriate pixel color. Referring to FIG. 4, the pixels 120, 122, 124 and 126 of the layer immediately adjacent to the horizontal and vertical boundaries of the selected pixel 128 are examined. If the selected pixel 128 is on the boundary of the image, the number of neighboring pixels is reduced accordingly. If all of the adjacent pixels 120, 122, 124, and 126 are out-of-layer pixels for which a color has not been assigned 82, the pixel in question is assigned a predetermined default color 84. While the default color can be any color, black is a convenient default color because black text is often included in the foreground layer. Referring to FIG. 2, in the separation foreground layer 14, an area at the top of the image 42 (indicated by a bracket) comprises unassigned out-of-layer pixels. Since all neighbors of any pixel in this area 42 are out-of-layer pixels the default color is assigned to pixels of this area 44 (indicated by a bracket) in the final foreground layer 40.

When the default color is assigned to a selected pixel 84, the data relating the co-occurrence of pixel colors is updated 86 utilizing color data for the adjacent pixel from the image and the mask layer 88. The default color is assigned to the spatially corresponding pixel of the final foreground layer 90 and the pixel data is stored with data of for the final layer 76.

If the neighbors 120, 122, 124, and 126 of the selected pixel 128 are not all unassigned, out-of-layer pixels 82, the image and the separated foreground layer data 94 are checked to determine that the colors of all in-layer pixels of the neighboring plurality are included in the color map 96. If the color of an in-layer neighboring pixel is not in the color map, its color is added to the color map 98.

The colors of the in-layer pixels of the neighboring plurality 120, 122, 124, and 126 are compared. If any of the in-layer neighboring pixels are of the same color, the method determines whether a color predominates for the in-layer pixels of the neighboring plurality 102. If the colors of the in-layer neighboring pixels are divided equally between two colors, the color of the pixel immediately to the left 124 of the selected pixel 128 is assigned to the selected pixel 104. On the other hand, if at least two neighboring pixels are of the same color and the remaining pixels are of differing colors, the subject pixel is assigned the value of the color of that predominates for the neighboring pixels 106. In the exemplary final layer 40, the out-of-layer pixels are assigned the default color until the inlayer pixels of the text element 26 are reached. Thereafter, the out-of-layer pixels will be assigned the second color of the text 26 until the in-layer pixels of the text element 28 are encountered as indicated by the bracket 50. The color of the pixels of the text element 28 will thereafter control the color of the out-of-layer pixels as indicated by the bracket 52. Once the color has been assigned, the co-occurrence data is updated 86 and the assigned value is stored for the spatially corresponding pixel in the data for the final layer 92.

If none of the neighboring in-layer pixels are of the same color, the selected pixel is assigned a color value based on the co-occurrence of pixels of particular colors or the likelihood that a pixel of a particular color will occur in conjunction with neighboring pixels of particular colors 108. Referring to FIG. 4, the neighboring in-layer pixels 120, 122, 124, and 126 are of differing colors (A) 124, (B) 122, (C) 126, and (D) 120, respectively. The color of the selected pixel (Y) 128 is assumed to be, alternately, each of the colors, A, B, C, and D of the neighboring pixels. For each color (Y) of the selected pixel 128, the data expressing the number of occurrences of pixels of that color adjacent to pixels of each of the colors (A, B, C, and D) is determined. For example, if the selected pixel is assigned the color A, the number of times that two pixels of color A occur in adjacency is compared to the numbers of times that pixels of color A appear adjacent to pixels of colors B, C, and D. The color assigned to the selected pixel 128 is selected from the maximum of:

$Y_A=\hat{Y}\in\{B,C,D\}\ni$ co-occurrence (color A, Color $\hat{Y}$) is maximum.

$Y_B=\hat{Y}\in\{A,C,D\}\ni$ co-occurrence (color B, Color $\hat{Y}$) is maximum, $Y_C=\hat{Y}\in\{A,B,D\}\ni$ co-occurrence (color C, Color $\hat{Y}$) is maximum, $Y_D=\hat{Y}\in\{A,B,C\}\ni$ co-occurrence (color D, Color $\hat{Y}$) is maximum, and $a_A$, $a_B$, $a_C$, and $a_D$ are the corresponding values of from the co-occurrence accumulator. The value of the out-of-layer pixel is chosen such that a. is maximized. For example, if the maximum $\{a_A, a_B, a_C, a_D\}=a_A$, the color of the neighboring pixel (A) 124 is assigned to the selected pixel 128 in the final layer 40. In other words, if a pixel of color A occurs adjacent to another pixel of color A more often than with B, C, or D colored pixels, the selected, out-of-layer pixel 128 is assigned color A.

An alterative method of assigning a color to the selected out-of-layer pixel 128 when the neighboring in-layer pixels are of differing colors 108, assigns the selected pixel the color of the neighboring pixel corresponding to the maximized sum of the co-occurrence data for pixels of colors corresponding to the neighboring colors of the neighboring pixels. For all in-layer neighboring pixels 120 (color D), 122 (color B), 124 (color A), and 126 (color C) define:

$\Sigma_A=\Sigma\hat{Y}\in\{B,C,D\}$ co-occurrence (color A, color $\hat{Y}$), $\Sigma_B=\Sigma\hat{Y}\in\{A,C,D\}$ co-occurrence (color B, color $\hat{Y}$), $\Sigma_C=\Sigma\hat{Y}\in\{A,B,D\}$ co-occurrence (color C, color $\hat{Y}$), $\Sigma_D=\Sigma\hat{Y}\in\{A,B,C\}$ co-occurrence (color B, color $\hat{Y}$), The color of the out-of-layer selected pixel 128 is chosen such that $\Sigma$. is maximized. If the selected pixel is assumed to be color A and the sum of the co-occurrences of A colored pixels with pixels of colors A, B, C, and D is greater than the sum of the co-occurrences of B, C, or D colored pixels with pixels of these colors, the selected out-of-layer pixel is assigned color A.

Application of the method to the separation foreground layer 14, results in a final foreground layer 40 comprising bands of the default color 44 (indicated by a bracket), the color 50 (indicated by a bracket) of the text element 26, and the color of the second text element 52 (indicated by a bracket). The application of a lossless compression process to the final separation layer 40 will produce a compact data file that can be readily selected and combined with the background layer to produce a recomposed image.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of generating an out-of-layer pixel of a decomposition layer for an image comprising the steps of:
   (a) identifying a plurality of pixels neighboring said out-of-layer pixel;
   (b) assigning a default color to said out-of-layer pixel if said plurality of neighboring pixels are out-of-layer pixels for which no color is assigned;
   (c) assigning a color predominating for in-layer pixels of said plurality of neighbors to said out-of-layer pixel;
   (d) assigning a color of a predetermined neighboring pixel to said out-of-layer pixel if equal numbers of said in-layer neighboring pixels are of a plurality of colors; and
   (e) if no two said in-layer neighboring pixels are of the same color, assigning to said out-of-layer pixel a color of a neighboring pixel that is most likely to occur in conjunction with pixels of said colors of said in-layer neighboring pixels.

2. The method of claim 1 wherein the step of assigning to said out-of-layer pixel a color of a neighboring pixel that is most likely to occur in conjunction with pixels of said colors of said in-layer neighboring pixels comprises the steps of:
   (a) determining a number of occurrences of adjacency of a pixel of a color of an in-layer, neighboring pixel and a pixel of each of said colors of said in-layer, neighboring pixels; and
   (b) assigning to said out-of-layer pixel said color of said in-layer, neighboring pixel corresponding to a maximum of said occurrences of adjacency.

3. The method of claim 2 further comprising the steps of:
   (a) recording an occurrence of adjacency of a pixel of a color of an in-layer pixel with a pixel of a color of a previously selected pixel;
   (b) assigning a color to an out-of-layer pixel; and
   (c) recording an occurrence of adjacency of a pixel of said color assigned to said out-of-layer pixel with a pixel of a color of a previous pixel.

4. The method of claim 1 wherein assigning a color of a predetermined neighboring pixel to said out-of-layer pixel if equal numbers of said in-layer neighboring pixels are of the same colors comprises the step of assigning to said out-of-layer pixel a color of said neighboring pixel immediately to the left of said out-of-layer pixel.

5. The method of claim 1 wherein the step of assigning to said out-of-layer pixel a color of a neighboring pixel that is most likely to occur in conjunction with pixels of said colors of said in-layer neighboring pixels comprises the steps of:
   (a) determining a sum of a number of occurrences of adjacency of a pixel of a color of an in-layer, neighboring pixel with a pixel of each of said colors of said in-layer, neighboring pixels; and
   (b) assigning to said out-of-layer pixel said color of said in-layer, neighboring pixel corresponding to a maximum of said sums of occurrences of adjacency.

6. The method of claim 5 further comprising the steps of:
   (a) recording an occurrence of adjacency of a pixel of a color of an in-layer pixel with a pixel of a color of a previously selected pixel;
   (b) assigning a color to an out-of-layer pixel; and
   (c) recording an occurrence of adjacency of a pixel of said color assigned to said out-of-layer pixel with a pixel of a color of a previous pixel.

7. A method of generating a layer of a decomposed image comprising the steps of:
   (a) selecting a pixel of said image;
   (b) determining if said selected pixel is an in-layer pixel to a layer of said decomposed image;
   (c) if said selected pixel is an out-of-layer pixel, identifying a plurality of pixels of said decomposition layer neighboring said selected pixel;
   (d) assigning a default color to a pixel of said decomposition layer spatially corresponding to said selected pixel if all said pixels of said neighboring plurality are out-of-layer pixels;

(e) assigning a color predominating for in-layer, neighboring pixels to said spatially corresponding pixel;

(f) assigning to said spatially corresponding pixel a color of a predetermined neighboring pixel if equal numbers of said in-layer neighboring pixels are of the same plurality of colors;

(g) if no two said in-layer neighboring pixels are of the same color, assigning to said spatially corresponding pixel a color of a neighboring pixel that is most likely to occur in conjunction with pixels of said colors of said in-layer neighboring pixels;

(h) if said selected pixel is an in-layer pixel, assigning a color of said selected pixel to said spatially corresponding pixel; and (i) storing said color assigned to said spatially corresponding pixel in data of said decomposition layer.

8. The method of claim 7 wherein the step of assigning to said spatially corresponding pixel a color of a neighboring pixel that is most likely to occur in conjunction with pixels of said colors of said in-layer neighboring pixels comprises the steps of:

(a) determining a number of occurrences of adjacency of a pixel of a color of an in-layer, neighboring pixel and a pixel of each of said colors of said in-layer, neighboring pixels; and (b) assigning to said spatially corresponding pixel said color of said in-layer, neighboring pixel corresponding to a maximum of said occurrences of adjacency.

9. The method of claim 8 further comprising the steps of:

(a) assigning a color to a spatially corresponding pixel; and (b) recording an occurrence of adjacency of a pixel of said color assigned to said spatially corresponding pixel with a pixel of a color of an earlier assigned pixel of said layer.

10. The method of claim 7 wherein assigning a color of a predetermined neighboring pixel to said spatially corresponding pixel if equal numbers of said in-layer neighboring pixels are of the same colors comprises the step of assigning to said spatially corresponding pixel a color of said neighboring pixel immediately to the left of said selected pixel.

11. The method of claim 7 wherein the step of assigning to said spatially corresponding pixel a color of a neighboring pixel that is most likely to occur in conjunction with pixels of said colors of said in-layer neighboring pixels comprises the steps of:

(a) determining a sum of a number of occurrences of adjacency of a pixel of a color of an in-layer, neighboring pixel with a pixel of each of said colors of said in-layer, neighboring pixels; and (b) assigning to said spatially corresponding pixel said color of said in-layer, neighboring pixel corresponding to a maximum of said sums of occurrences of adjacency.

12. The method of claim 11 further comprising the steps of:

(a) assigning a color to said spatially corresponding pixel; and (b) recording an occurrence of adjacency of a pixel of said color assigned to said spatially corresponding pixel with a pixel of a previously assigned pixel color.

* * * * *

UNITED STATES PATENT AND TRADEMARK OFFICE
CERTIFICATE OF CORRECTION

PATENT NO. : 6,701,012 B1
DATED : March 2, 2004
INVENTOR(S) : Kristine E. Matthews It is certified that error appears in the above-identified patent and that said Letters Patent is hereby corrected as shown below:

Column 4,
Line 12, change "out-lo-layer" to -- out-of-layer --.

Signed and Sealed this

Twentieth Day of December, 2005

JON W. DUDAS
*Director of the United States Patent and Trademark Office*